(12) United States Patent
Scannell, Jr.

(10) Patent No.: US 6,279,265 B1
(45) Date of Patent: Aug. 28, 2001

(54) PLANT POT WITH WATER LEVEL CONTROL DEVICE

(76) Inventor: Robert F. Scannell, Jr., 89 Smithfield Ct., Basking Ridge, NJ (US) 07920

( * ) Notice: Subject to any disclaimer, the term of this patent is extended or adjusted under 35 U.S.C. 154(b) by 0 days.

(21) Appl. No.: 09/197,980

(22) Filed: Nov. 23, 1998

Related U.S. Application Data

(62) Division of application No. 08/826,081, filed on Mar. 24, 1997, now abandoned.

(51) Int. Cl.$^7$ ............................................. A01G 25/00
(52) U.S. Cl. ............................................................. 47/79
(58) Field of Search ............................ 47/59, 79, 62, 47/81; 62/304; D11/164

(56) References Cited

U.S. PATENT DOCUMENTS

| | | | |
|---|---|---|---|
| 124,207 | * | 3/1872 | Hess ........................................ 47/79 |
| D. 257,529 | * | 11/1980 | Raap .................................... D11/164 |
| 3,243,919 | * | 4/1966 | Carlson .................................. 47/79 |
| 3,483,656 | * | 12/1969 | Baumann ................................. 47/59 |
| 3,988,857 | * | 11/1976 | Baumann ................................. 47/59 |
| 4,270,309 | * | 6/1981 | Baumann ................................. 47/59 |
| 4,419,842 | * | 12/1983 | Paloian ................................... 47/62 |
| 4,916,858 | * | 4/1990 | Hobson ................................... 47/81 |
| 5,272,835 | * | 12/1993 | Stern ...................................... 47/79 |
| 5,956,964 | * | 10/1999 | Wright .................................. 62/304 |

FOREIGN PATENT DOCUMENTS

| | | | |
|---|---|---|---|
| 7339503 | * | 2/1974 | (DE) ....................................... 47/59 |
| 2316275 | * | 10/1974 | (DE) ....................................... 47/59 |
| 2345899 | * | 3/1975 | (DE) ....................................... 47/59 |

OTHER PUBLICATIONS

Plants Without Soil–A Clever, 30–Year–Old Swiss Idea (C. Oelrich, Aug. 1997, International News).*
Hydroponic Gardeners Grow What They Want To Eat Any Time Of Year (M. Barrow, Mar. 1999, The Virginia Pilot).*

* cited by examiner

Primary Examiner—Charles T. Jordan
Assistant Examiner—Francis T. Palo
(74) Attorney, Agent, or Firm—Kenneth P. Glynn, Esq.

(57) ABSTRACT

The present invention planter water level control device includes a pot with water level indicators and a drainage mechanism to prevent or eliminate overfill of liquid. In some embodiments it includes both a pot and a pot holder. Either the pot or the pot holder of both may contain the water level indicator and may contain the drainage mechanism. One version of the water level indicator is a housing with a water inlet opening in the form of a tube, and this may or may not include a float or stem. Alternative indicators include vertical transparent sections as well as electronically based signaling.

3 Claims, 4 Drawing Sheets

PLANT POT WITH WATER LEVEL CONTROL DEVICE

This application is a division of application Ser. No. 08/826,081 filed Mar. 24, 1997, now abandoned.

BACKGROUND OF THE INVENTION

1. Field of the Invention

The present invention relates to planters and, more particularly, to planters having a water indicating device and a drainage mechanism to prevent overflow or overfill.

2. Information Disclosure Statement

Various types of planters having a water indicating device or water regulating means have been designed. The following represents the state of the art:

U.S. Pat. No. 5,446,994 issued to Wen S. Chou discloses a flower pot including a pot body having an annular water reservoir disposed at the top, a water supply regulator consisting of a base block disposed in the annular water reservoir, a water guiding strap having a leading end dipped in water in the annular water reservoir and an opposite end extended into the pot body to guide water from the annular reservoir into the pot body by capillary action, and an adjusting block moved in a vertical sliding slot on the base block to adjust the elevation of the leading end of the water guiding strap in water; and a locating device fastened to the pot body to hold down the water guiding strip.

U.S. Pat. No. 5,375,371 to Anthony L. Wells discloses a watering system which consists of a water supply, an area of soil, vegetation within the area of soil and a mechanism for conveying water from the water supply by capillary action to the vegetation within the area of soil, so that the vegetation can grow normally within the soil.

U.S. Pat. No. 5,347,751 to Frans Carpay describes and illustrates a modular plant stand which may be assembled easily from a kit and when disassembled, the parts may be stacked together in a compact bundle. The plant stand has a number of vertical corner members, a number of wall panels which fit between adjacent corner members, a top collar and a bottom collar. The corner members and wall panels fit into channels in the top and bottom collars. The top collar has an inwardly extending flange from which an inner soil containing liner, which may be a plant pot suspended from its top edge. The inner liner hangs down inside the plant stand and is therefore hidden from view. The sides and bottom of the inner liner are exposed to the air inside the plant stand and are therefore well ventilated. The weight of the inner liner and any materials that it contains helps to stabilize and hold together the plant stand. The bottom collar of the plant stand may be equipped with a flange to support a drip tray below the inner liner.

U.S. Pat. No. 5,228,229 to Mats Lindgren relates to a plant growing and cultivation system comprising a plant growing table, plant growing containers mounted in the table, as well as a drainage system for surplus water and condensing water from the plant containers. The table is built with profiles connected to each other and forming bearing supports for plant containers mounted in the table, which bearing supports include elements which forms channels for passing water. The channels are located in a bottom of the device.

U.S. Pat. No. 5,095,649 to Richard W. Brownlee describes an illustrates a storage receptacle assembly which includes a housing made up of stepped side walls, a rear wall, a front wall section at each step and top wall sections at each step. At least one container is located at each step, preferably received in an opening defined by the top wall section thereat. The containers define at least one water drain opening therein which is associated with a water drain system and with appropriate controls for maintaining water within the container or draining same therefrom. A cut item separator support may be provided within the containers for dividing the inside of the containers into a plurality of compartments for the receipt of floral items therein and for water-free transfer of foliage from one container to another.

U.S. Pat. No. 5,042,197 to Graeme S. Pope discloses a plant container having selectable drainage characteristics including a bottom and side walls, and a drainage riser extending interiorly from the bottom. The riser has drainage openings adjacent the interior extremity and including an opening communication through the bottom. A removable plug is provided for closing the bottom opening. A plant support and drainage platform is removably fitted across the enclosure above the extremity of the drainage riser, so as to define a plenum between the drainage platform and the riser.

U.S. Pat. No. 4,171,593 to Edwin J. Bigglestone describes and illustrates a pot for growing plants which includes a water level indicator and outer pot and an inner pot having a lower portion of reduced diameter through which water is conducted upwardly by surface tension activity. The water level indicator includes a float in the water reservoir having a stem extending upwardly through a water inlet to indicate the water level.

U.S. Pat. No. 4,055,991 to Willie Earl Bridwell discloses a liquid gauge mechanism in which the casing for the gauge mechanism is at least partially submerged within the root system and surrounding liquid so as to indicate the level of liquid within the container. An indicator element is movably disposed within the hollow container of the gauge mechanism and has indicia formed thereon so as to be viewable through the casing of the indicator means. The level of liquid within the container is the same as the level of liquid within the casing. The indicator element being floatable within the casing serves to position the indicia thereon in aligned relation with a window or viewing portion through the casing so as to indicate the level of the liquid relative to the root system of the plant maintained within the container.

U.S. Pat. No. 3,926,143 to Harold A. Hothan discloses a liquid detecting gauge which has a tubular housing in which is confined a spherical float with an attached float stem. The housing is a rigid tube enclosed at top and bottom by friction fitting caps, the bottom cap being distinguished by an upstanding flange which fits the tube tightly at its lower end and then diverges from the tube wall to form a gutter at the base of that wall. The spherical float is freely movable within the tube and the float stem extends upwardly from the float and through a guide hole at the center of the top cap. A rain cap is attached to the top of the stem and is sized to cover the space between the stem and guide hole to keep water from overhead sprinklers out of the housing.

U.S. Pat. No. Design 257,529 to Joachim E. Raap discloses an ornamental design for a combined plant pot liner and a water level gauge.

Notwithstanding the prior art, the present invention is neither taught nor rendered obvious thereby. None of the prior art listed above discloses a liquid gauge attached to a bottom or a side of a pot and also having a drainage mechanism on a side of the pot.

SUMMARY OF THE INVENTION

The present invention planter water level control device includes a pot with a water level indicator means and a drainage means to prevent or eliminate overfill of liquid. In some embodiments it includes both a pot and a pot holder. Either the pot or the pot holder of both may contain the water indicator level means and may contain the drainage means. One version of the water level indicator means is a housing with a water inlet opening in the form of a tube, and this may or may not include a float or stem. Alternative indicators include vertical transparent sections as well as electronically based signalling means.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
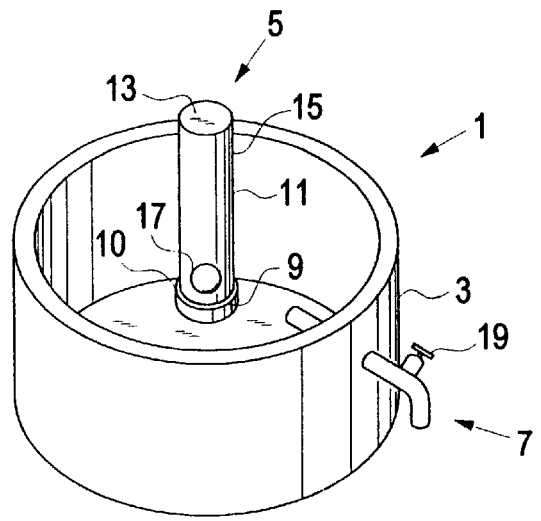
FIG. 1 is an elevational front view of a planter water level control device having a water level indicator attached to a bottom of the device.

The present invention is a planter water level control device. The device can be a pot or be a pot assembly including a pot holder and at least one inner pot. The device includes at least one water level indicator means and at least one drainage means to prevent overflow or overfill of liquid. Thus, the present invention device may have both the water level indicator means and the drainage means as part of the pot assembly or both may be part of a pot holder assembly, or either one of these means may be located on a pot or the other on a pot holder. When a device is a pot, it may be a single piece or connected components. When the device includes both a pot and a pot holder, they may be separately constructed or formed integrally, may by physically connected to one another or the pot may nest within the holder or merely rest therein. The pot may be a garden pot, a fanciful large vase, a floor pot, a hanging pot, a modular pot and the like. The pot may have a transparent portion on a side for viewing the water level indicator means. An optional cover may be placed over the transparent portion, and this may be made out of a material that matches the material of the pot or may otherwise be constructed.

The preferred embodiment of the water level indicator means has a housing having a body, a top, and a float. The body essentially includes at least one opening to allow water to enter the water level indicator means so that it may seek its own level and concomitantly raise the float to indicate that water level. This opening may advantageously be located at or near the bottom but should at least be low enough to permit intake of water at lower levels of concern to the user or, below an optional minimum water level indicator line. Also, note that the float enhances visual identification of the water level, but the float may be eliminated and the water level itself will be the visual indicator. There may also be an optional stem attached to the float which rises up through an aperture in the top as the level of liquid in the water level indicator rises. The level of the float in the water level indicator means may be optionally viewed through a transparent portion in a side of the pot. Also, the opening in the body of the housing of the water level indicator means may include a filterable material. The filterable material may be a mesh or small perforation grid. The exact size of the mesh or grid openings depends upon the type of rock/soil that may be used in the pot, but must be small enough to prevent soil, rock and other pot material to enter the water level indicator means, yet be large enough to prevent water to enter.

The water level indicator is attached to a receiving portion in a bottom or a side of the pot. The dimensions of the projecting portion are smaller than the dimensions of the receiving portion so that the projecting portion and receiving portion may be friction fitted, snap fitted and the like.

The drainage means is located on a side of the pot and contains a release valve for draining liquid. The release valve may be a spigot, a lever, a push-in valve, a pull valve, a plug or the like. The drainage means may protrude beyond the pot or be recessed in the pot.

When the pot is filled with enough liquid, the liquid will flow through the water level indicator means housing into an interior of the body. The liquid in the body will cause the float to rise and consequently the stem, if included, will rise through the top closure means. By either viewing the level of the float through the transparent portion on the pot or viewing the level of the stem above the top closure means, one can determine the level of liquid within the float. Thus, by viewing the water level indicator,there will be an indication of the level of liquid within the pot.

When the water level indicator shows that the liquid level is too high, the release valve of the drainage means may be released to drain liquid from the pot. Thus, the drainage means prevents overflow or overfill.

Another embodiment of the water level indicator means includes a pot made from a transparent material. Thus, the liquid level may be visually determined.

Still yet another embodiment of the water level indicator includes electronic sensors on the inner sides of a housing of the water level indicator means connected to a chip. This chip may be wired to any power source such as a battery, solar cell, house current or any other low voltage power source which may be available. In the case where the house current is utilized, appropriate electronics to produce the desired voltage and amperage would be included. The chip is wired to a level indicator. This indicator may be a digital display which displays the level of the liquid, as determined from the electrical sensors. Alternatively, it could be merely a warning light which illuminates, a flashing light, a color change indicator, a sounding device or any combination of these.

In one embodiment, when the device is a pot holder which includes at least one inner pot, the pot holder may contain a drainage means and a water level indicator means. In addition, the at least one inner pot may contain a drainage means and a water level indicator means, thereby allowing for variation in watering requirement for the plant in each pot.

The present invention device may include either components which are available for pot planting such as insertable aeration devices layering devices, water capacity increasing contours, snap together componentry, raised posts or bubbles in the pot holders and any other features and/or ancillary components which are available for planting pots. These may be utilized as separate components or may be structurally integrated into present embodiments of present invention devices.

Referring now to FIG. 1, there is shown a present invention planter water level control device 1. The planter water level control device 1 includes a pot 3, a water level indicator means 5 and a drainage means 7.

The pot 3 includes a receiving portion 9 in the bottom of the pot 3 for receiving the water level indicator means 5. The water level indicator means includes an opening 10, in this case, a space between receiving portion 9 and body 11 to permit water inflow. The water level indicator means 5 includes a housing 15 having a body 11, a top closure means 13, an open bottom establishing opening 10 and a float means 17. The float means 17 is adapted to fit within the housing 15 and to rise when the water level within the housing 15 rises. The housing may, as mentioned, include a material which allows liquid to flow through it, but not dirt and other particles. Some materials may be mesh, plastic grid, porous plastic, porous foam or any other functional material.

The drainage means 7 includes a release valve 19 for allowing liquid to flow out of the drainage means 7. In this case, the release valve 19 includes a faucet. Many other drainage means may be utilized without exceeding the scope of the present invention. They include push button type faucets, plugs, screw type valves, snap valves, pull valves or any other type of valving means.

Figure 2:
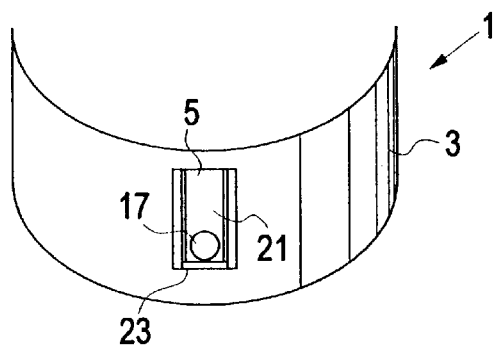
FIG. 2 is a partial rear elevational view of the planter water level control device show in FIG. 1 with a transparent portion on the device exposing the water level indicator.
Figure 3:
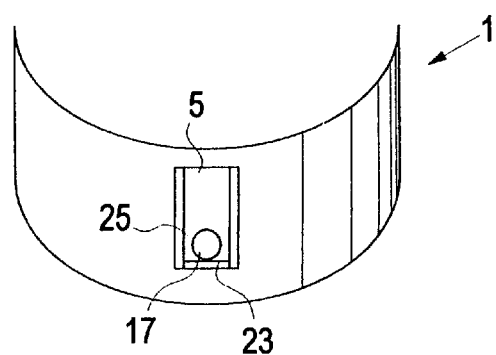
FIG. 3 is a side view of the planter water level control device shown in FIG. 2 but having a cover inserted into the transparent portion.

Referring now to FIGS. 2 and 3, there is shown a partial rear elevational view of the planter water level control device 1. The pot 3 includes a transparent portion 21 for viewing the level of the float 17 of the water level indicator means 5. The transparent portion 21 may include a ledge 23 or other securing means, e.g. a hinge for securing an optional cover 25 which may be placed over the transparent portion 21 for aesthetic reasons to hide the indicator means from normal view, e.g. for expensive fanciful and ornate pieces. Thus, the cover 25 may be made from a material similar to that of the pot, thereby making the pot more aesthetically pleasing.

When a viewer determines that the liquid level is too high by the position of the float 17 within the water level indicator means 5, the faucet 19 on the drainage means 7 (FIG. 1) is rotated to a position which causes the liquid to flow out of the pot 3. When the liquid is drained, the faucet 19 is rotated to a closed position thereby preventing flow of liquid. Obversely, when float 17 is near the bottom indicating a very low water level, it is time for the user to re-water the plant.

Figure 4:
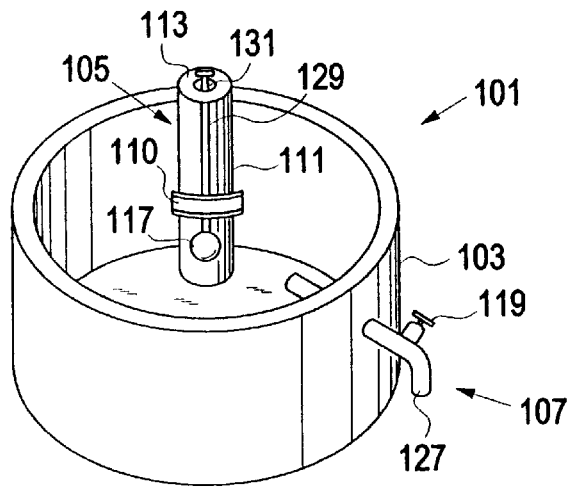
FIG. 4 is an elevational view of another embodiment of a planter water level control device having a water level indicator with a stem and attached to a side of the device.

Referring now to FIG. 4, there is shown an alternate embodiment of the present invention planter water level control device 101, having water level indicator means 105 and pot 103. Like parts are similarly numbered to those in FIG. 1, but incremented by 100.

The water level indicator means 105 includes a stem 129 attached to a top of a float 117. The stem 129 may extend through an aperture 131 in a top closure means 113. As the water level rises, the stem 129 moves upward through the aperture 131 in the top closure means 113 and provides for determining the liquid level by the height of the stem 129 through the aperture 131. A receiving portion 110 for the water level indicator 105 is attached to a side of the pot 103. This receiving portion is made of filterable material and covers an opening in housing 111 through which water may enter.

Figure 5:
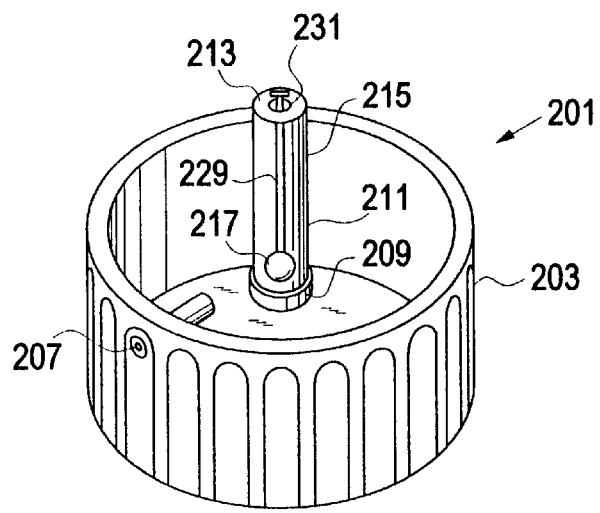
FIG. 5 is an elevational view of another embodiment of a planter water level control device having a recessed drainage mechanism.

Referring now to FIG. 5, there is shown an alternate embodiment drainage means 207. Like parts are similarly numbered to those in FIG. 1, but incremented by 100. The drainage means 207 is a push-in valve and is recessed within the side of the pot 203. In the case of recessed push-in valves, an optional water receptacle tube may be provided to the user to avoid spillage during draining.

Figure 6:
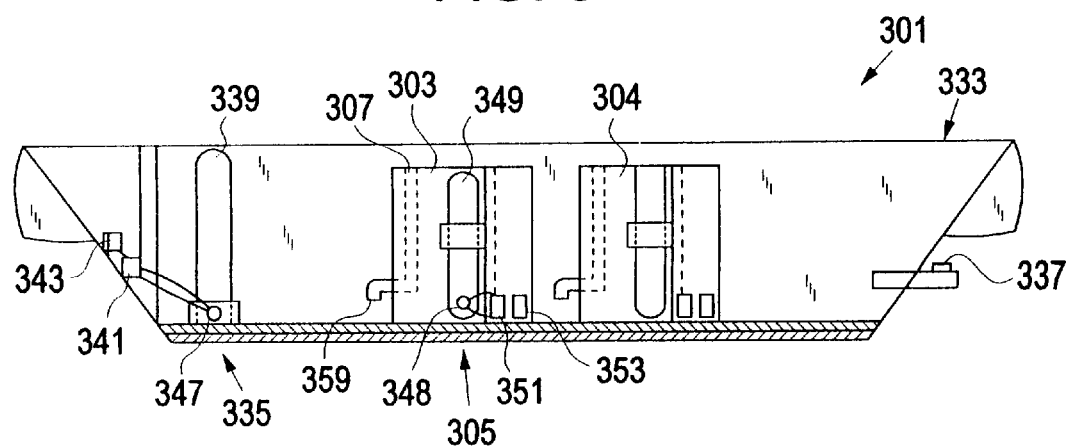
FIG. 6 is a front cut cross sectional view of another embodiment of a planter water level control device having multiple inner pots and an electronic sensing water level indicator.

Still yet another embodiment of the planter water level control device 301 is shown in FIG. 6. The device 301 includes a multiple pot holder 333 (dish receptacle for one or more pots) and a plurality of inner pots 303 and 304.

Figure 7:
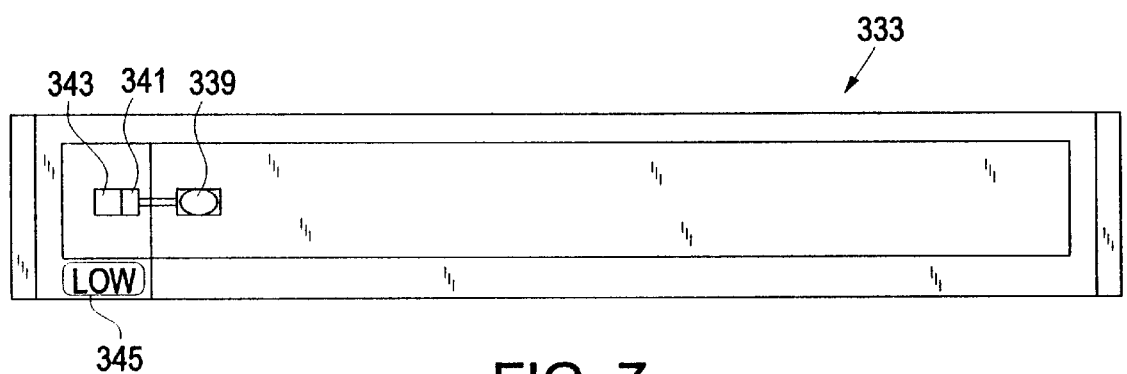
FIG. 7 is a top view of the planter water level control device shown in FIG. 6 with the inner pots removed.

The pot holder 333 includes a water level indicator means 335 and a drainage means 337. The water level indicator means 335 includes an electronic sensor 347 on an interior of a housing 339 connected to a chip 341 which is wired to a battery 343 or other power source. The chip 341 is also wired to a digital display 345 (see FIG. 7) which displays the level of the liquid, as determined from the electronic sensor 347. As mentioned above, other types of signalling devices may be used in place of or in addition to the digital display 345. The housing 339 may include a filterable material portion, such as mesh, etc., or small perforations which allow liquid to flow through but prevents dirt and other particles from entering.

The drainage means 337 extends to an outer side of the pot holder 333 but the design of the pot holder 333 causes the drainage means 337 to be hidden when viewing the exterior of the pot holder 333. The design of the drainage means shown in FIGS. 1 and 4 could also be used with a differently designed pot holder.

Figure 8:
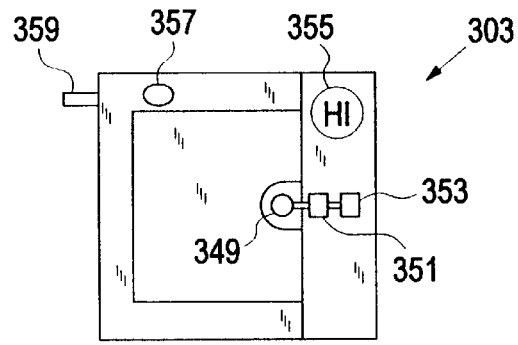
FIG. 8 is a top view of one of the inner pots shown in the planter water level control device of FIG. 6.

Each inner pot 303 includes a water level indicator means 305 and a drainage means 307. The water level indicator means 305 includes an electronic sensor 348 on an interior of a housing 349 connected to a chip 351 which is wired to a battery 353. The chip 351 is also wired to a digital display 355 (see FIG. 8) which displays the level of the liquid, as determined from the electrical sensor 348. The housing 349 is made from a filterable material, such as mesh, etc., which allows liquid to flow through but prevents dirt and other particles from entering.

The drainage means 307 includes a push in valve 357 (see FIG. 8) on the top of the inner pot 303 for releasing liquid from a discharge pipe 359 on a lower level within the inner pot 303.

Figure 9:
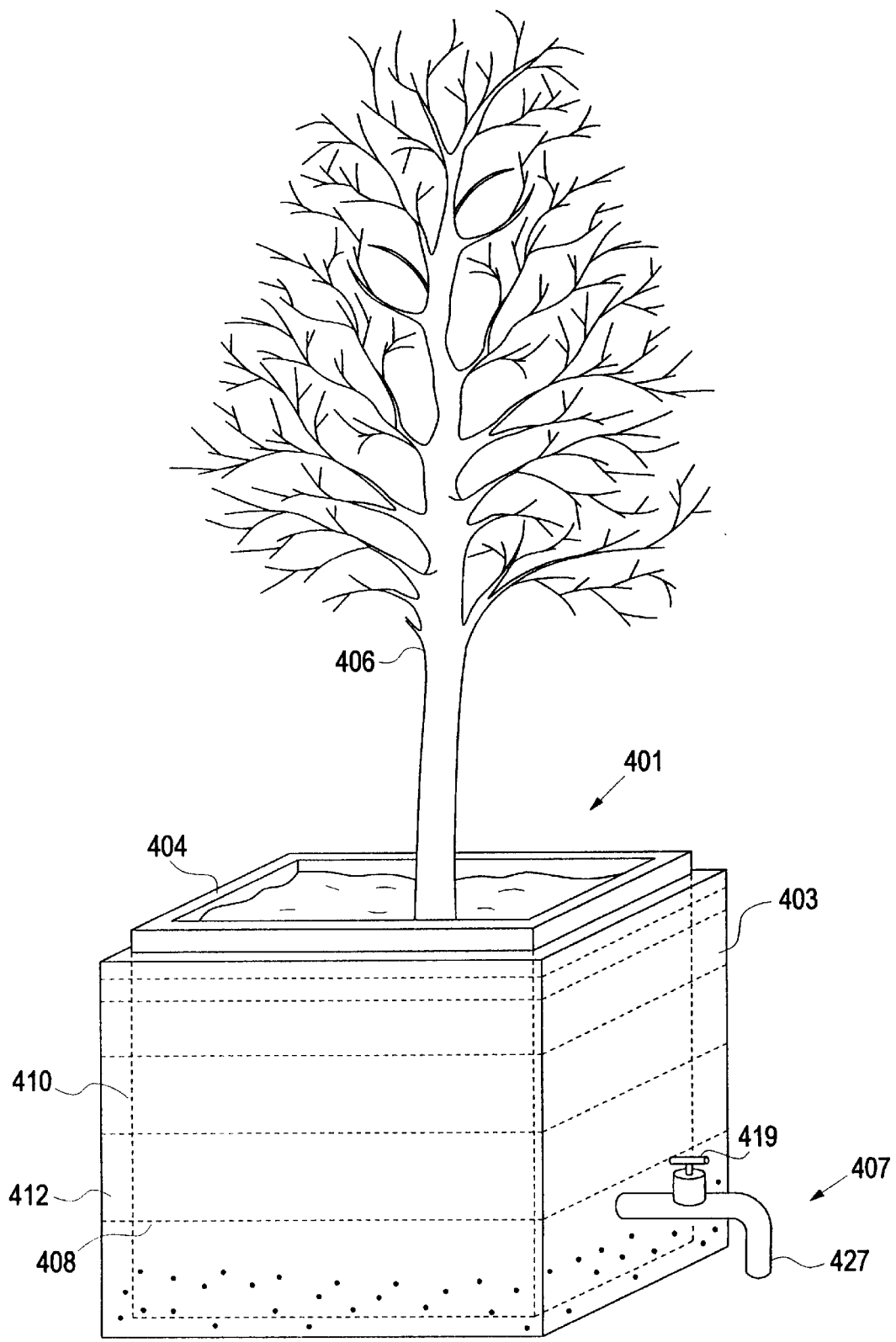
FIG. 9 is a perspective view of another embodiment of a planter water level control device having a transparent pot as a water level indicator.

Referring now to FIG. 9, there is shown an alternate embodiment of planter water level control device 401. In this embodiment, water level indicator means is a transparent pot holder 403 containing pot 404 and miniature tree 406, thereby allowing for viewing through the pot holder 403 for the liquid level. The pot 404 includes at least one opening such as opening 408 to permit water to seep out of pot 404 and into pot holder 403. Also, drainage means 407 includes a valve 419 and downpipe 427 for drainage. Optional high and low level indicators 410 and 412 are marked on the side of pot holder 403, as shown.

Figure 10:
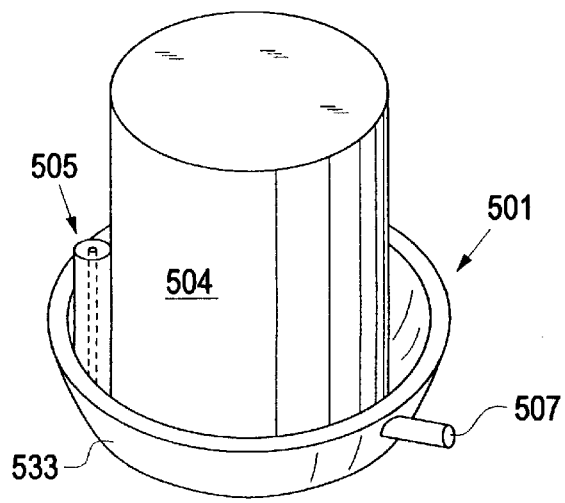
FIG. 10 is an elevational view of another embodiment of a planter water level control device having one pot.

Referring now to FIG. 10, there is shown still yet an alternate embodiment of planter water level control device 501. Like parts are similarly numbered to those in FIG. 1, but incremented by 500. In this embodiment, there is a pot holder 533 which includes a water level indicator means 505 and a drainage means 507. The pot holder 533 is adapted to hold one inner pot 504. However, the inner pot is a traditional pot with drainage holes on the bottom. Also, in place of utilizing water level indicator means 505, the pot holder 533 could be completely transparent or have a vertical transparent section to indicate water level.

Obviously, numerous modifications and variations of the present invention are possible in light of the above teachings. For example, the invention can be hanging, rest on the floor, be placed on a shelf or be placed in an arm stand. It is therefore understood that within the scope of the appended claims, the invention may be practiced otherwise than as specifically described herein.

What is claimed is:

1. A planter water level control device, which comprises:
   (a.) a pot including a water level indicator means, said water level indicator means includes a housing with a top closure means and a bottom opening communicating with said pot, and said housing has a vertical portion made from transparent material whereby a level of liquid may be visually determined, and having a float means located and fitted in said housing so as to be able to move upwardly toward a the top closure means of said housing when liquid passes into said housing, said pot further including a transparent portion on a side of said pot for viewing said water level indicator means;
   (b.) a drainage means located on a side of said pot for preventing or eliminating overfill of liquid.

2. The planter water level control device of claim 1 wherein said drainage means includes a release valve for selectively allowing said liquid to flow out of said drainage means.

3. The planter water level control device of claim 1 wherein said float means is a ball float.

* * * * *